Figure 1:
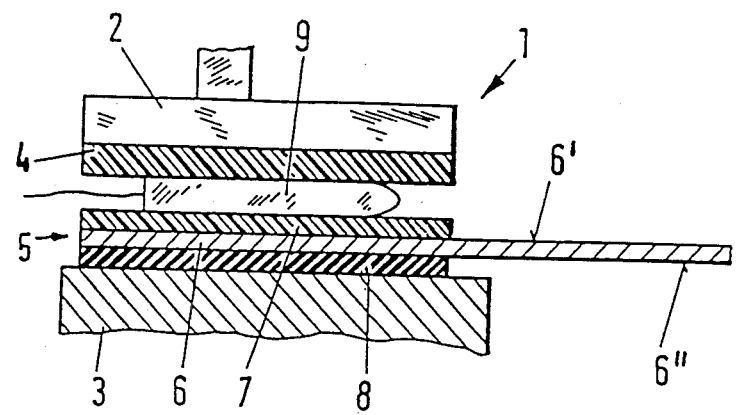

United States Patent [19]
Steiner

[11] Patent Number: 4,669,511
[45] Date of Patent: Jun. 2, 1987

[54] PROJECTILE BRAKE FOR A WEAVING MACHINE

[75] Inventor: August Steiner, Winterthur, Switzerland

[73] Assignee: Sulzer Brothers Limited, Winterthur, Switzerland

[21] Appl. No.: 809,484

[22] Filed: Dec. 16, 1985

[30] Foreign Application Priority Data

Jan. 16, 1985 [CH] Switzerland .................... 100402/85

[51] Int. Cl.[4] ............................................ D03D 49/54
[52] U.S. Cl. ................................................. 139/185
[58] Field of Search ........................ 139/183, 185, 186

[56] References Cited

U.S. PATENT DOCUMENTS

| 1,956,076 | 4/1934 | Lindsjo | 139/185 |
| 3,211,185 | 10/1965 | League | 139/185 |
| 3,403,708 | 10/1968 | Sundquist | 139/186 |
| 3,865,150 | 2/1975 | Demuth | 139/185 |

FOREIGN PATENT DOCUMENTS 392950 4/1924 Fed. Rep. of Germany ...... 139/185

Primary Examiner—Henry S. Jaudon
Attorney, Agent, or Firm—Kenyon & Kenyon

[57] ABSTRACT

One or both of the brake shoes of the projectile brake is provided with a composite brake lining composed of a carrier plate, a brake on one side of the carrier plate facing the projectile and a damping plate secured to the opposite side of the carrier plate. The Shore hardness of the brake plate is much higher than that of the damping plate.

5 Claims, 2 Drawing Figures

U.S. Patent   Jun. 2, 1987   4,669,511

PROJECTILE BRAKE FOR A WEAVING MACHINE

This invention relates to a projectile brake for a weaving machine.

As is known, weaving machines are usually provided with a brake for braking the travel of a projectile, or the like, which is used for the picking of a weft thread on the catching side of the shed. For example, the brakes have been constructed with a pair of brake shoes between which a projectile can be braked to a stop. Further, the brake shoes have been provided with a brake lining to facilitate the braking action. For example, use has been made of relatively elastic material such as a Vulkollan ®. However, the present day picking rates of weaving machines are so high that such brake linings are subject to heavy wear and have a short working life. Consequently, use has been made of a harder and less resilient plastics than the previously used plastics.

While the use of a harder and less resilient plastic increases the brake lining life, the brake linings become relatively rigid. Thus, the projectiles experience knocks during braking and they, therefore, lose the weft yarn. Knocks are also the cause of cracks in the brake linings which may result in a breakage of the lining.

Accordingly, it is an object of the invention to provide a projectile brake with a brake lining having a long working life.

It is another object of the invention to provide a brake lining which is suitable for use with high speed picking operations.

It is another object of the invention to provide a projectile brake which is able to avoid knocking of a projectile during braking.

Briefly, the invention provides a projectile brake for a weaving machine which is comprised of a pair of brake shoes and a pair of brake linings each of which is secured to a respective brake shoe in facing relation to the brake lining. In accordance with the invention, at least one of the brake linings is formed of a carrier plate, a brake plate which is secured to one side of the carrier plate in facing relation to the other brake lining and a damping plate which is secured to the opposite side of the carrier plate. The brake plate is formed of a material which has a greater Shore hardness than the damping plate, for example the brake plate may be made of a wear-resistant plastics while the damping plate is made of an elastic material.

Figure 2:
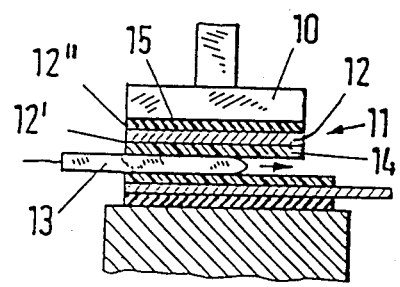

These and other objects and advantages of the invention will become apparent from the following detailed description taken in conjunction with the accompanying drawings wherein:

FIG. 1 illustrates a front view of a projectile brake constructed in accordance with the invention; and FIG. 2 illustrates a modified projectile brake constructed in accordance with the invention.

Referring to FIG. 1, the projectile brake is constructed for use in a weaving machine and to this end includes a top brake shoe 2 and a bottom brake shoe 3. In addition, suitable means (not shown) are provided to bring the brake shoes 2, 3 together in order to brake a moving projectile 9 to a stop without loss of a trailing weft yarn. As indicated, the brake shoes 2, 3 are provided with brake linings 4, 5 which are disposed in facing relation to slidably engage the projectile 9.

Further, the lining 5 of the bottom brake shoe 3 is comprised of a carrier plate 6, for example, of metal, a brake plate 7 which is secured to one side 6' of the carrier plate and in facing relation to the other brake lining 4 and a damping plate 8 secured to the opposite side 6" of the carrier plate 6 adjacent to the bottom brake shoe 3.

The brake plate 7 is made of a material having a greater Shore hardness than the damping plate 8. For example the brake plate 7 may be made of a wear-resistant plastics having a Shore hardness of approximately 90A while the damping plate 8 is made of a Vulkollan ® elastic material with a Shore hardness of approximately 60A. With this combination of materials, optimum use is made of the properties of both materials which serve to brake the projectile 9.

As indicated in FIG. 1, the carrier plate 6 is extended axially beyond the brake shoes 2, 3 so that the composite brake lining 5 can be pulled out when there is a need to replace the lining 5.

Referring to FIG. 2, both of the brake shoes of a projectile brake may be provided with a composite brake lining as described above. For example, the top brake shoe 10 may be provided with a composite brake lining 11 composed of a carrier plate 12, a brake plate 14 secured to one side 12' of the carrier plate 12 in facing relation to the other brake lining and a damping plate 15 secured to the other side 12" of the carrier plate 12. As above, the brake plate 14 is made of a wear-resistant plastics having a Shore hardness of approximate 90A while the damping plate is made of a Vulkollan ® elastic material having a Shore hardness of approximate 60A.

The invention thus provides a projectile brake which is capable of providing a relatively hard surface for braking purposes while also providing a damping layer to absorb the impact stresses of the brake during operation.

What is claimed is:

1. A projectile brake for a weaving machine comprising
    a pair of brake shoes; and
    a pair of brake linings, each said lining being secured to a respective brake shoe in facing relation to the other brake lining, at least one of said brake linings including a carrier plate, a wear resistant plastics brake plate secured to one side of said carrier plate and in facing relation to said other brake lining with a relatively hard braking surface and a damping plate secured to an opposite side of said carrier plate and in facing relation to said one brake shoe, said damping plate having a lesser Shore hardness than said brake plate to absorb impact stresses during operation.

2. A projectile brake as set forth in claim 1 wherein said carrier plate is made of metal and said damping plate is made of elastic material.

3. A projectile brake as set forth in claim 1 wherein said brake plate has a Shore hardness of approxiamtely 90A and said damping plate has a Shore hardness of approximately 60A.

4. A projectile brake as set forth in claim 1 wherein said carrier plate extends axially beyond said brake shoes for removal of said one brake lining.

5. A projectile brake as set forth in claim 1 wherein each wear resistant plastics brake lining includes a carrier plate, a brake plate secured to one side of said carrier plate and in facing relation to said other brake lining and a damping plate secured to an opposite side of said carrier plate.

* * * * *